United States Patent Office 3,479,039
Patented Nov. 18, 1969

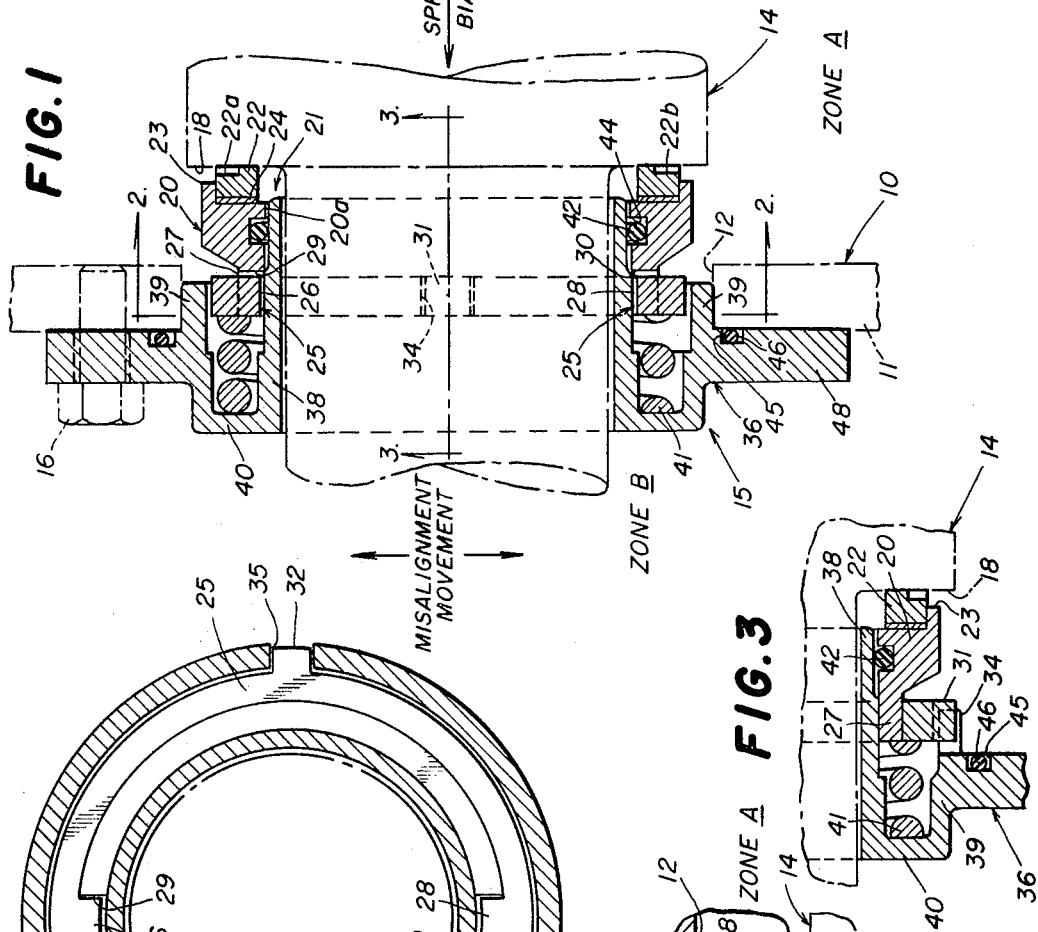

3,479,039
ROTARY SEALS
Peter F. Pinkas, Cleveland, Ohio, assignor to Borg-Warner Corporation, Chicago, Ill., a corporation of Illinois
Filed Aug. 24, 1967, Ser. No. 663,134
Int. Cl. F16j 15/34, 15/54
U.S. Cl. 277—30                            3 Claims

ABSTRACT OF THE DISCLOSURE

An improved seal assembly, adapted for use with a fluid pump drive shaft to effect isolation of respective zones through which the shaft extends, while permitting a limited amount of axial misalignment of the drive shaft by providing a vivotal O-ring support substantially at the interface between the drive shaft and the seal assembly.

---

The present invention relates to rotary seals of the type used in fluid pumps and more particularly to an improved seal of such type which is capable of compensating for limited axial misalignment of a drive shaft in such pumps.

An example of a rotary seal is given in Prijatel U.S. Patent No. 3,272,518 issued Sept. 13, 1966. Though the structure thereshown is completely capable of handling drive shaft misalignments, there are problems encountered with lubricating the wobble washer. Furthermore, it is desirable to maintain the number of parts, which comprise the seal assembly, to a minimum so that tolerances in the construction of the individual parts do not need to be held to a relatively close value.

Accordingly, it is an object of the present invention to provide an improved rotary seal assembly permitting pivotal movement of a rotary shaft about more than one axis, which is capable of compensating for axial misalignment of the shaft, maintaining the pivoting structure lubricated with pumped fluid, while preventing leakage of fluid between respective zones through which the shaft extends.

It is a further object of the present invention in accordance with the above, to provide an improved rotary seal assembly which provides for pivotal movement of the shaft about a support in close proximity to the juncture between the seal and the rotary shaft so as to effect isolation between respective zones through which the shaft extends, even with substantial misalignment of the drive shaft.

It is an overall object of the present invention to provide an improved rotary seal assembly which is economical to manufacture and simple to maintain.

Other objects and advantages of the present invention will become apparent upon reading the following detailed description and upon:

FIGURE 1 is an elevation, partially in section, of a rotary seal assembly embodying the invention;

FIGURE 2 is a section taken along line 2—2 in FIGURE 1;

FIGURE 3 is a section taken along line 3—3 in FIGURE 1; and

FIGURE 4 is a fragmentary section showing a modified embodiment of the present invention.

Referring now to the drawings and to FIGURE 1 in particular, thereshown in a frame 10, herein exemplarily illustrated as the housing of a fluid pump, having a substantially planner surface 11. The housing is provided with an opening 2 through which a drive shaft 14 extends. The drive shaft 14 operates in two separate pressure zones, a first zone A and a second zone B. A structure of this type, operating in this manner is exemplified by a large capacity fuel pump, used on aircraft transports, for example.

For isolating zone A from one B, while permitting relative rotation between the drive shaft 14 and the frame 10, a seal assembly 15 is provided. As herein illustrated, suitable means are used for mounting the seal assembly 15 on the frame 10, in the present instance a plurality of cap screws 16, one of which is shown. The seal assembly 15 engages drive shaft 14 at a face 18. The latter is defined, in the present instance, by a shoulder on shaft 14 resulting from forming the shaft with a reduced diameter section. It will be appreciated that the seal assembly engaging face 18 may take other forms such as a generally radially extending flange (see FIG. 4), exact radial extension not being necessary, as long as a complementarily formed means is provided by the seal assembly 15. As viewed in FIGURE 1, the shaft 14 is spring biased to the left so that the face 18 is pressed against the seal assembly 15.

In accordance with the present invention the seal assembly 15 effects a seal between the respective zones A and B through which the drive shaft 14 extends, while permitting a substantial degree of axial misalignment between the drive shaft and the frame 10 and maintaining the pivoting structure lubricated with fluid in zone A. As exemplified by the present embodiment, the seal assembly includes a carrier 20 having an annular shape and surrounding the reduced diameter portion of the drive shaft 14. The carrier 20 is of a larger diameter than the shaft so as to define an annular space 21 between a carrier internal wall 20a and the shaft. A rotary seal 22 is mounted on end 23 of carrier 20, in the present instance, by a suitable bonding agent, for example, an epoxy resin 24. The rotary seal 22 is preferably constructed of a lubricant type material, for example carbon, formed with circumferentially spaced lubricant receiving recesses, two of which, 22a, 22b, are shown. The drive shaft face 18 is pressed against the rotary seal 22 by spring action, thereby blocking one fluid leakage path while rotatably supporting the drive shaft 14. The seal ring 22 is stationary.

To compensate for axial misalignment and movement of the drive shaft 14, relative to a stationary, support structure within the seal assembly 15, a wobble or pivot plate 25 is provided (see FIGURE 2) as a part of the latter structure. As exemplarily shown, the plate 25 includes a first pair of internal projections 26, 28 which are received in complementarily shaped respective recesses 29, 30 provided in an opposite end 27 of the carrier 20. These interfitting means permit movement about a first axis which, as viewed in FIGURE 2 is a vertical axis.

To permit pivotal movement about a second axis, the wobble plate 25 includes a pair of external projections 31, 32 received in complementary recesses 34, 35 provided in a retainer 36. The retainer 36, as herein illustrated, is generally U-shaped with an internal wall or leg 38, an external wall or leg 39 and a body portion 40 joining the latter structures. It is a feature of the present invention that the wobble plate operates in the fluid present in zone A and thus is lubricated thereby. Both the internal projections 26, 28 and external projections 31, 32 pivot in the fluid in zone A. The retainer external leg 39 includes the aforementioned recesses 34, 35 for receiving the wobble plate projections. The internal leg 38 extends into the annular space 21 between the carrier 20 and the reduced diameter portion of drive shaft 14. The purpose of this is explained subsequently.

For pressing the wobble plate 25 and carrier 20 against the drive shaft face 18, a spring 41 is provided. As herein illustrated, the spring 41 is of the compression type, being disposed between retainer walls 38, 39 with one end pressing against retainer body portion 40 and the opposite end pressing against the retainer end 27 and wobble plate 25.

Describing additional structure for effecting isolation of zone A from zone B, besides the coaction of drive shaft face 18 being pressed against seal 22, a second seal is effected by providing an O-ring 42 which is disposed in an annular recess 44 formed in the internal wall 20a of carrier 20 so that the O-ring is pressed against the internal wall or leg 38 of the retainer 36. It is a feature of the present invention that the pivotal support for the drive shaft 14, O-ring 42, is located close to the interface between the rotating portion of the shaft face 18 and the stationary portion of the seal assembly, ring seal 22. Accordingly, a more reliable seal can be maintained by the O-ring even with substantial misalignment of shaft 14.

To assure that leakage of fluid under pressure does not occur between the seal assembly 15 and frame 10, in the exemplary embodiment an annular recess 45 carrying an O-ring 46 is formed in a flange 48, the latter being an integral extension of the retainer external leg 39. Tightening of the cap screws 16 squeezes the O-ring against frame surface 11.

Explaining the advantageous operation of the present invention as can be best appreciated from viewing FIGURES 1 and 3, the O-ring 42 is positioned in proximity with the juncture of the seal 22 and shaft face 18. The invention is especially adapted for misalignment occurring at the lefthand end of drive shaft 14 as viewed in FIGURE 1. The point of shaft pivot permitted by the wobble plate 25, is about the O-ring 42 riding on the stationary internal wall 38. To maintain a seal between respective zones A and B, the juncture of shaft face 18 and seal 22 must be maintained in as complete surface-to-surface engagement as possible. Accordingly, because the pivot point for the misalignment is provided so close to the juncture of the sealing surfaces substantial axial misalignments, can be compensated for while maintaining sealing integrity. Also, the wobble plate is immersed in the fluid present in zone A so as to be lubricated thereby.

An alternative embodiment of the present invention is shown in FIGURE 4 adapted for use with a different frame or housing. The seal assembly operates in the same manner, however, it is in a more compact and more easily handled package. There has been a change in the structure of a retainer 36a, having internal wall 38a, external wall 39a, and body portion 40a, so that there is not an integral flange. Accordingly, the seal assembly 15a can be received within the frame opening 12. To this end, an O-ring retaining groove 60 is provided in the periphery of the opening 12, and an O-ring 61 is squeezed between the retainer external wall 39a and the frame. The O-ring 61, in the alternative embodiment, substitutes for the O-ring 46 in the first embodiment. A retainer ring 62 is fastened to the frame 10 by suitable means, as herein illustrated by a plurality of flat-head screws 64, one of which is shown.

As is clear from the foregoing, the seal assemblies 15, 15a are both effective in compensating for substantial misalignment at the lefthand end of shaft 14 as viewed in FIGURE 1, and still assure isolation of fluid, for example, in zone A from the environment of zone B. The zones are separated by the sealing surfaces 22, 18, the O-ring 42 and the O-ring 46 or the O-ring 61 in the alternative embodiment.

While I have described my invention in connection with one specific embodiment, it is to be understood that this is by way of illustration and not by way of limitation and the scope of my invention is defined solely by the appended claims which should be construed as broadly as the prior art will permit.

What is claimed is:

1. In a rotary seal assembly supported by a frame for effecting isolation of fluid in a first zone from leaking into a second zone through which a shaft extends, the combination comprising an axially engageable face defined on the shaft substantially at the juncture between the respective zones, a seal assembly mounted on said frame to rotatably support said shaft and compensate for axial misalignment of the latter while preventing leakage between the respective zones, the improvement in said seal assembly characterized by a carrier of annular shape having opposite ends adapted to surround the shaft while defining an annular space between an internal wall and the shaft and disposed to one side of said shaft face, a seal mounted at one end of said carrier for engagement with said shaft face, a wobble plate having respective first and second engageable means to permit pivotal movement about a pair of respective axes, first complementary means provided at the other of said carrier ends adapted to receive said wobble plate first axis defining engagement means, a retainer of annular shape having respective internal and external legs and a body portion joining said legs, said internal leg disposed adjacent the shaft and in said annular space, a second complementary means carried by said external leg for receiving said wobble plate second axis defining engageable means, a spring carried by said retainer effective to press said carrier and seal against said shaft face thereby contributing toward effecting a seal between the respective zones through which the shaft extends, an O-ring disposed between said carrier internal wall and said retainer internal leg to also contribute toward effecting a seal between the respective zones while maintaining said wobble plate first and second engageable means, respectively, in communication with fluid in the first zone, and means associated with said retainer for mounting said sealing assembly on said frame.

2. In a rotary seal assembly supported by a frame for effecting isolation of fluid in a first zone from leaking into a second zone through which a shaft extends, the combination comprising an axially engageable face defined on the shaft substantially at the juncture between the respective zones, a seal assembly mounted on said frame to rotatably support said shaft and compensate for axial misalignment of the latter, while preventing leakage between the respective zones, the improvement in said seal assembly characterized by a carrier of annular shape having opposite ends adapted to surround the shaft while defining an annular space between an internal wall and the shaft and disposed to one side of said shaft face, a seal mounted at one end of said carrier for engagement with said shaft face, a wobble plate having respective internal and external projections to permit pivotal movement about a pair of respective axes passing through said respective projections, first complementary recesses provided at the other, opposite end of said carrier to receive said wobble plate internal projections, a retainer of annular shape having respective internal and external legs and a body portion joining said legs, said internal leg disposed adjacent the shaft and in said annular space, second complementary recesses provided in said external leg for receiving said wobble plate external projections, a spring carried by said retainer effective to press said carrier and seal against said shaft face thereby contributing toward effecting a seal between the respective zones through which the shaft extends, an O-ring disposed between said carrier internal wall and said retainer internal leg to also contribute toward effecting a seal between respective zones while maintaining said wobble plate internal and external legs, respectively, in communication with fluid in the first zone, and means associated with said retainer for mounting said sealing assembly on said frame.

3. The combination of claim 2 wherein said pivotal axes are perpendicularly related and an additional O-ring is disposed between the frame and said retainer to further contribute to effecting a seal between the respective zones through which the shaft extends.

References Cited

UNITED STATES PATENTS

| 3,272,518 | 9/1966 | Prijatel | 277—30 |
| 3,311,381 | 3/1967 | Pech | 277—30 |

SAMUEL ROTHBERG, Primary Examiner

U.S. Cl. X.R.

277—85, 91